US011683372B2

(12) United States Patent
Guendert et al.

(10) Patent No.: US 11,683,372 B2
(45) Date of Patent: Jun. 20, 2023

(54) VIRTUALIZED FABRIC MANAGEMENT SERVER FOR STORAGE AREA NETWORK

(71) Applicant: International Business Machines Corporation, Armonk, NY (US)

(72) Inventors: Stephen Robert Guendert, Poughkeepsie, NY (US); Pasquale A. Catalano, Wallkill, NY (US); Michael James Becht, Poughkeepsie, NY (US); Christopher J. Colonna, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/102,475

(22) Filed: Nov. 24, 2020

(65) Prior Publication Data

US 2022/0166831 A1    May 26, 2022

(51) Int. Cl.
*H04L 67/1097* (2022.01)
*H04L 41/0893* (2022.01)
*H04L 9/40* (2022.01)
*H04L 49/356* (2022.01)

(52) U.S. Cl.
CPC ...... *H04L 67/1097* (2013.01); *H04L 41/0893* (2013.01); *H04L 49/357* (2013.01); *H04L 63/205* (2013.01)

(58) Field of Classification Search
CPC ............ H04L 67/1097; H04L 41/0893; H04L 63/205; H04L 49/357; H04L 41/0894; H04L 41/40
See application file for complete search history.

(56) References Cited

U.S. PATENT DOCUMENTS

| 6,597,956 | B1 * | 7/2003 | Aziz ................... G06F 9/45504 700/3 |
| 7,548,975 | B2 | 6/2009 | Kumar et al. |
| 8,041,987 | B2 * | 10/2011 | Allen ................. G06F 11/2005 714/5.11 |
| 8,151,318 | B1 * | 4/2012 | DeSanti ............... H04L 49/357 726/3 |

(Continued)

FOREIGN PATENT DOCUMENTS

| CA | 2405405 C | 3/2011 |
| EP | 3382964 A1 * | 10/2018 ......... G06F 9/45558 |

(Continued)

OTHER PUBLICATIONS

Guendert et al., "Virtualized Fabric Login Server for Storage Area Network," U.S. Appl. No. 17/102,473, filed Nov. 24, 2020.

(Continued)

*Primary Examiner* — Patrice L Winder
(74) *Attorney, Agent, or Firm* — Cantor Colburn LLP; Edward Wixted (57) ABSTRACT

Techniques for a virtualized fabric management server for a storage area network are described herein. An aspect includes operating a storage area network, the storage area network including a hybrid control plane. Another aspect includes managing, using a virtualized fabric management server and the hybrid control plane, the storage area network, wherein the virtualized fabric management server is disposed in a container that is hosted on an element of the storage area network.

15 Claims, 6 Drawing Sheets

(56) References Cited

U.S. PATENT DOCUMENTS

| | | | |
|---|---|---|---|
| 8,351,442 B1* | 1/2013 | McGlaughlin | G06F 13/128 370/401 |
| 8,559,433 B2 | 10/2013 | Berman | |
| 8,565,118 B2* | 10/2013 | Shukla | H04L 41/0806 370/254 |
| 8,713,218 B2* | 4/2014 | Chaurasia | G06F 3/0632 710/38 |
| 9,098,200 B2* | 8/2015 | Nakajima | G06F 3/0605 |
| 9,270,754 B2 | 3/2016 | Iyengar et al. | |
| 9,560,078 B2 | 1/2017 | Sood et al. | |
| 9,699,027 B2* | 7/2017 | Bharadwaj | H04L 41/18 |
| 9,722,922 B2 | 8/2017 | Kamath et al. | |
| 9,854,048 B2 | 12/2017 | Rajagopal et al. | |
| 10,038,494 B1 | 7/2018 | Paraschis et al. | |
| 10,104,015 B2 | 10/2018 | Hughes et al. | |
| 10,567,308 B1* | 2/2020 | Subbiah | G06F 9/45558 |
| 10,574,477 B2 | 2/2020 | Bharadwaj | |
| 10,880,235 B2* | 12/2020 | Cohen | H04L 49/351 |
| 11,119,965 B1* | 9/2021 | Guendert | G06F 9/45558 |
| 11,522,814 B2 | 12/2022 | Guendert et al. | |
| 2004/0049564 A1 | 3/2004 | Ng | |
| 2008/0162681 A1* | 7/2008 | Yellapragada et al. | H04L 41/082 709/223 |
| 2011/0274114 A1 | 11/2011 | Dhar | |
| 2012/0239788 A1 | 9/2012 | Amber | |
| 2014/0173195 A1* | 6/2014 | Rosset | G06F 9/4405 711/114 |
| 2014/0351545 A1* | 11/2014 | Nakajima et al. | G06F 3/0617 711/170 |
| 2014/0365622 A1* | 12/2014 | Iyengar | H04L 67/1097 709/220 |
| 2016/0087841 A1* | 3/2016 | Bharadwaj | H04L 67/1097 709/221 |
| 2016/0191363 A1* | 6/2016 | Haraszti | H04L 67/14 709/223 |
| 2016/0366014 A1 | 12/2016 | Koo | |
| 2016/0378401 A1* | 12/2016 | Savic | G06F 3/061 710/74 |
| 2017/0012904 A1 | 1/2017 | Matzek | |
| 2017/0180240 A1 | 6/2017 | Kern | |
| 2018/0220210 A1 | 8/2018 | Paraschis | |
| 2018/0309662 A1* | 10/2018 | Clarke | H04L 67/59 |
| 2019/0007475 A1 | 1/2019 | Shi et al. | |
| 2019/0034367 A1 | 1/2019 | Kakalya et al. | |
| 2019/0042518 A1 | 2/2019 | Marolia et al. | |
| 2019/0109783 A1* | 4/2019 | Kommula | H04L 41/0816 |
| 2019/0334909 A1* | 10/2019 | Schmitt | G06F 3/0604 |
| 2020/0099610 A1 | 3/2020 | Heron et al. | |
| 2020/0244598 A1 | 7/2020 | Subbiah et al. | |
| 2020/0244599 A1 | 7/2020 | Varghese et al. | |
| 2020/0358719 A1* | 11/2020 | Mestery | H04L 47/78 |
| 2021/0011816 A1 | 1/2021 | Mitkar et al. | |
| 2021/0117242 A1 | 4/2021 | Van De Groenendaal et al. | |
| 2022/0159090 A1 | 5/2022 | Ding et al. | |

FOREIGN PATENT DOCUMENTS

| | | |
|---|---|---|
| KR | 100927748 B1 | 11/2009 |
| WO | 2014011927 A1 | 1/2014 |

OTHER PUBLICATIONS

Guendert et al., "Virtualized Fabric Name Server for Storage Area Network," U.S. Appl. No. 17/102,474, filed Nov. 24, 2020.
List of IBM Patents or Patent Applications Treated as Related; Appendix P; Date Filed: Dec. 3, 2020; 2 pages.

* cited by examiner

VIRTUALIZED FABRIC MANAGEMENT SERVER FOR STORAGE AREA NETWORK

BACKGROUND

The present invention generally relates to processing systems, and more specifically, to a virtualized fabric management server for a storage area network.

A storage area network (SAN) or storage network provides a dedicated network of storage device(s) to enable a processing system to access consolidated, block-level data storage. To the processing system, the storage device(s) appears to be locally attached and is not accessible to other devices through a local area network (LAN).

SUMMARY

Embodiments of the present invention are directed to a virtualized fabric management server for a storage area network. A non-limiting example computer-implemented method includes operating a storage area network, the storage area network including a hybrid control plane. The method also includes managing, using a virtualized fabric management server and the hybrid control plane, the storage area network, wherein the virtualized fabric management server is disposed in a container that is hosted on an element of the storage area network.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide a virtualized fabric management server for a storage area network (SAN). Several different approaches to network management have emerged. Two of these include software defined network and network function virtualization. Software defined networking (SDN) provides end users with the capability to have a non-proprietary network where the management and control capabilities do not reside in network vendors' proprietary operating systems and/or management tools. SDN has been applied to conventional internet protocol (IP)/Ethernet-based networking. Some of the features and functionality of SDN include: management/control functionality is shifted into open standards software residing on individual servers, containers, and/or virtual machines (VMs); end users are provided with more control than conventional network management approaches; network vendor lock-in is reduced; and conventional networks are transformed into agile platforms for service delivery.

Network function virtualization (NFV) is a concept that virtualizes elements in a network. In NFV, rather than using a dedicated hardware device to provide a particular function (e.g., a hardware router to provide routing), software running on a processing system is used to provide the particular function. In this way, entire classes of network node functions can be set up as building blocks that can be connected to create overall telecommunications networks, for example. NFV utilizes traditional processing system virtualization but extends the concept significantly. For example, one or more VMs running different software and providing different processes, on top of industry standard high volume processing systems, are able to provide the functions of conventional hardware switches. Examples of virtualized functions that can be provided include: virtualized load balancers, firewalls, intrusion detection devices, wide area network (WAN) accelerators, routers, access control, and billing, etc.

Typically, SDN and NFV management are offered through proprietary hardware running a proprietary network operating system (NOS). While effective in large scale environments, such approaches are technically difficult and expensive at smaller scales. In one or more examples, this can be accomplished by building a network using switching devices made up of standard commodity hardware that run various NOS. These switching devices provide the same level of network performance and reliability but at a lower cost and with more flexibility than traditional proprietary devices. The commodity hardware switching devices can run open source NOS, which can be intended for SDN/NFV use. SDN and NFV are complimentary in that these technologies can work together, and the same principles used in NFV can be used in storage networking.

Large scale implementations of SAN often utilize a fibre connection (FICON) or fibre channel protocol (FCP) director class of switches. Such implementations have connectivity requirements that require the use of switching. Smaller scale implementations of SAN have reduced connectivity requirements but higher costs for switching architectures. These smaller scale implementations cannot take advantage of advanced performance monitoring and management capabilities available in larger scale implementations and can be restricted by vendor lock-in and proprietary management tools.

One or more embodiments of the present invention provide a virtualized fabric management server for a SAN. The virtualized fabric management server provides software defined storage area network management and monitoring capabilities without the vendor lock-in and proprietary management tools often encountered in SAN implementations. As an example, the virtualized fabric management server described herein can reside on a channel card (also referred to as an input/output adapter card, or host bus adapter) or in a docker container on a node of the SAN. The virtualized fabric management server (or simply "fabric management server") can run on processors, application specific integrated circuits (ASICs), and the like that exist on a channel card in some embodiments of the invention.

Figure 1:
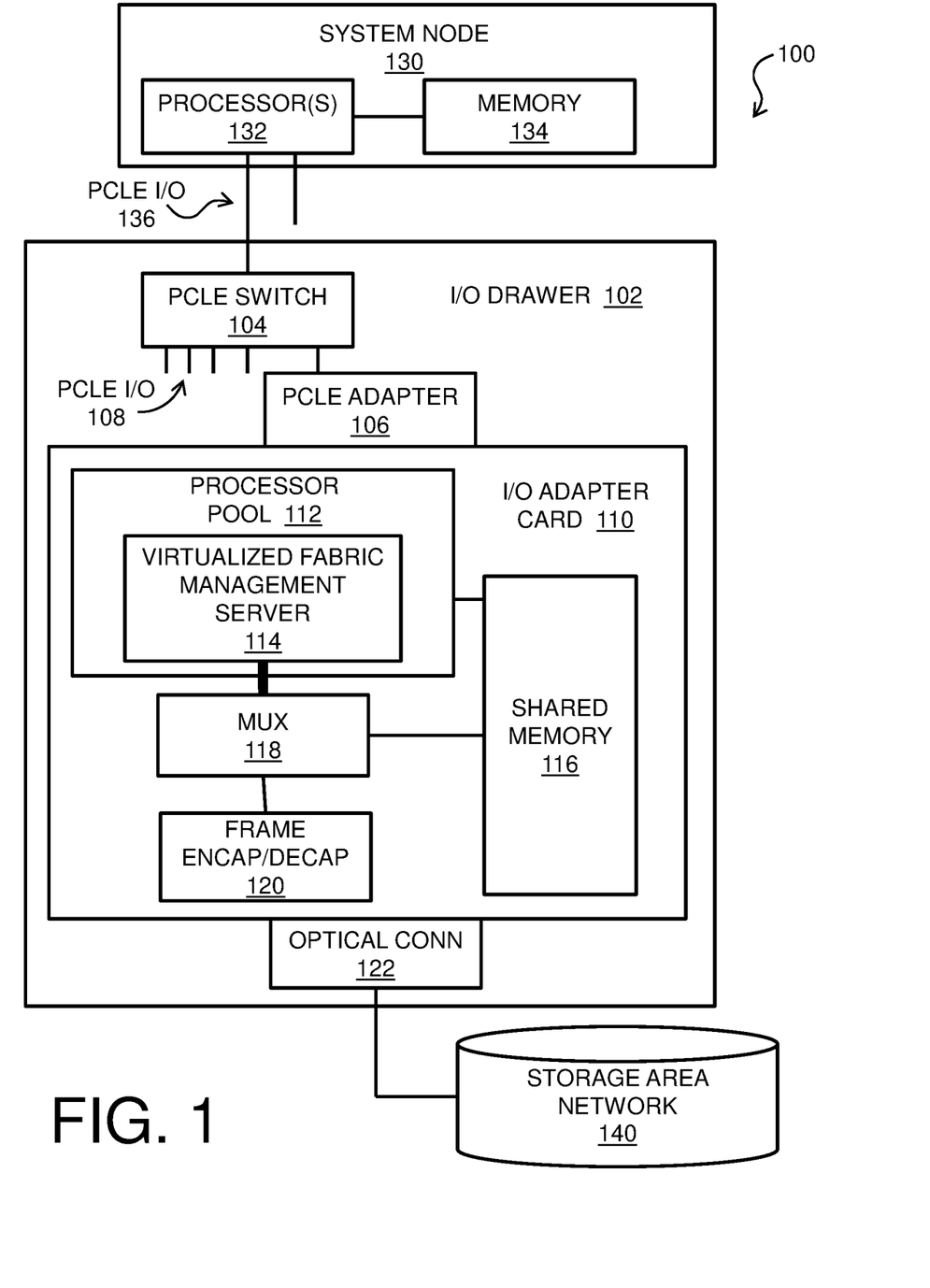
FIG. 1 is a block diagram of components of a system for a virtualized fabric management server for a storage area network in accordance with one or more embodiments of the present invention.

Turning now to FIG. 1 according to one or more embodiments described herein, a block diagram of a processing system 100 for a virtualized fabric management server 114 for a SAN 140 is depicted. Embodiments of processing system 100 can be implemented in conjunction with any appropriate computer system, including but not limited to computer system 600 of FIG. 6. The processing system 100 can be any suitable processing system, such as an IBM Z® environment processing system for example. The system node 130 of processing system 100 can store data in (i.e., transfer data to) and retrieve data from (i.e., receive data from) the SAN 140 via an input/output (I/O) drawer 102, which is communicatively coupled to the system node 130 and the SAN 140 as shown in FIG. 1. In some examples, the system node 130 is coupled to additional I/O drawers (not shown), such as by the peripheral component interconnect express (PCIe) connections 136, which also communicatively couples the system node 130 to the I/O drawer 102.

The system node 130 can include one or more processors 132, a memory 134, and other components (not shown). The system node 130, using the processor(s) 132, executes instructions stored in the memory 134 and transmits data to and receives data from the SAN 140 via the I/O drawer 102.

The I/O drawer 102 includes a PCIe switch 104. The I/O drawer 102 also includes an I/O adapter card 110 (also referred to as a channel card), although the I/O drawer 102 can include additional I/O adapter cards (i.e., channel cards) in other examples. The outputs of the PCIe switch 104 (i.e., the PCIe I/O 108) connect to PCIe adapters on the I/O adapter cards, such as the PCIe adapter 106 on the I/O adapter card 110.

The I/O adapter card 110, which can be a host bus adapter, performs I/O processing on data sent between the system node 130 and the SAN 140. The I/O adapter card 110 utilizes the PCIe adapter 106 to connect to the system node 130 and an optical connection 122 to connect to the SAN 140.

The I/O adapter card 110 can include various components, including a processor pool 112, a shared memory 116, a multiplexer (MUX) 118, and a frame encapsulation and decapsulation engine 120. The processor pool 112 includes one or more processors, which can include one or more central processing units, application specific hardware, application specific integrated circuits (ASICs), application specific special processors (ASSPs), field programmable gate arrays (FPGAs), and the like.

The MUX 118 selects between data from the processor pool 112 and the shared memory 116, and the frame encapsulation and decapsulation engine 120 performs encapsulation and decapsulation on the output and input of the MUX 118.

The I/O adapter card 110 shown in FIG. 1 also includes a virtualized fabric management server 114, which is executed by the processor pool 112. The virtualized fabric management server 114 thus resides in the channel card (i.e., the I/O adapter 110) and runs on processors/ASICs (e.g., the processor pool 112) that are on the I/O adapter 110. Although not shown, it should be appreciated that the virtualized fabric management server 114 can reside in a docker container executing on the system node 130 instead of on the I/O adapter card 110 in some embodiments of the present invention.

The fabric management server 114 is a logical entity that provides services to assist in managing the fibre channel fabric for the SAN 140. The fabric management server 114 can implement a number of sub-functions that can provide various fabric management services, including but not limited to a fabric zone server that provides zoning management in the SAN 140, a security policy server that provides security policy management in the SAN 140, a fabric configuration server, and an unzoned name server. The fabric management server 114 can further include a fabric management server interface that allows an administrator of the SAN 140 to manage and monitor the operation of the SAN 140 via the fabric management server 114. The SAN 140 can include any appropriate number of interconnected elements (e.g., storage, nodes, and/or switches) that are in communication with, and are managed by, the fabric management server 114 in processing system 100 via optical connection 122. The various nodes and/or switches in SAN 140 can include commodity hardware (as opposed to proprietary) that runs an open source NOS in some embodiments of the present invention. The elements of SAN 140 can be interconnected in any appropriate manner.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, storage area network elements, nodes, switches, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
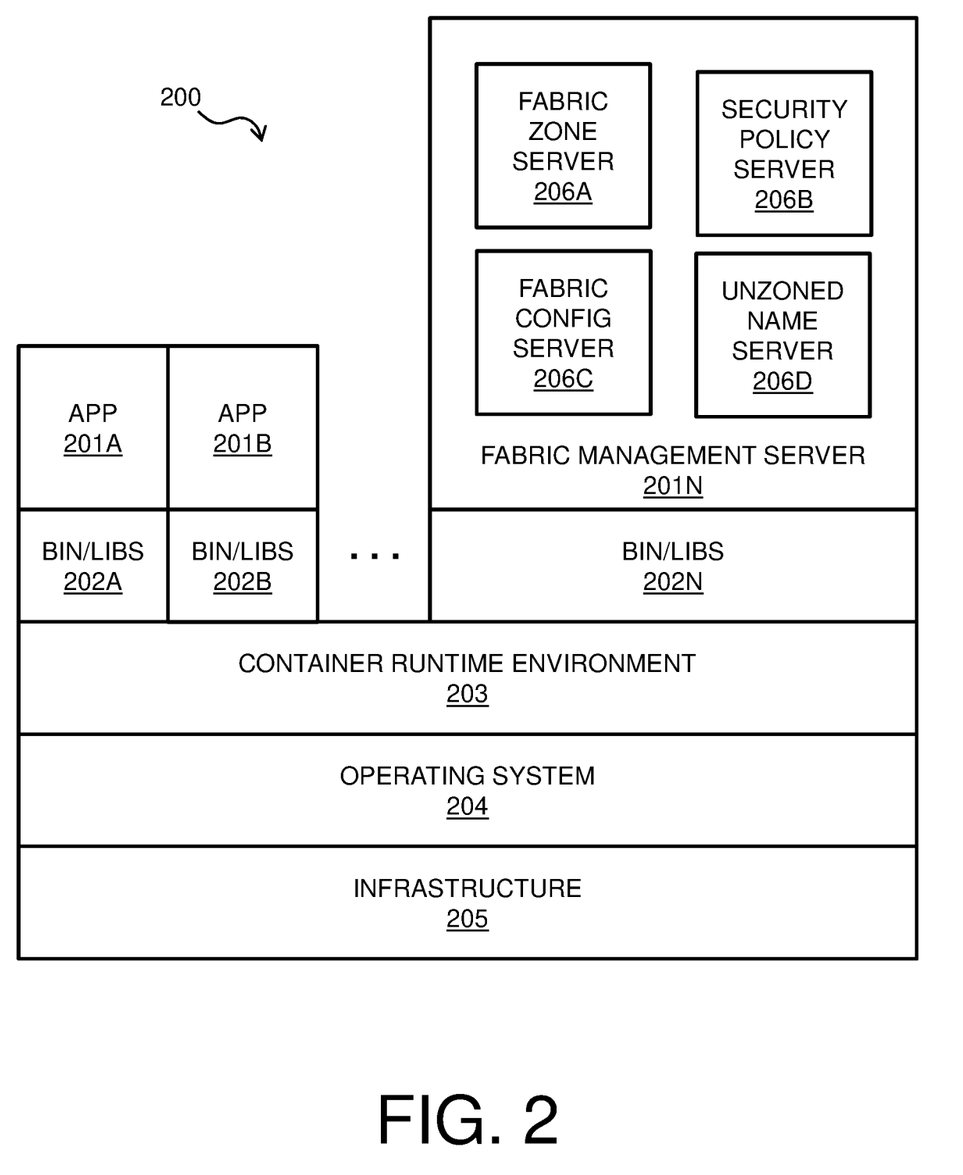
FIG. 2 is a block diagram of components of a container system including a virtualized fabric management server for a storage area network in accordance with one or more embodiments of the present invention.

FIG. 2 is a block diagram of components of a container system 200 including a virtualized fabric management server 201N for a storage area network in accordance with one or more embodiments of the present invention. Fabric management server 201N can correspond to fabric management server 114 of FIG. 1. Container system 200 includes a number of applications 201A-N, including fabric management server 201N, that are each hosted in a respective container. Each container includes a respective set of binaries and libraries (bin/libs 202A-N) that are run in the container to support the container's respective application of applications 201A-N. The containers are managed by container runtime environment 203, which runs on operating system 204. Operating system 204 is hosted by hardware infrastructure 205. Infrastructure 205 can correspond to I/O adapter card 110 of FIG. 1 in some embodiments of the present invention; however, a container system such as container system 200 can be implemented in conjunction with any appropriate computer infrastructure (e.g., system node 130) in various embodiments of the invention. The container runtime environment 203 can include any appropriate container runtime environment, including but not limited to a hypervisor such as Docker® in some embodiments of the invention, and can include a container management system such as Kubernetes® in some embodiments of the invention. The locations of the respective containers hosting each of applications 201A-N can be dynamic, such that the container runtime environment 203 tracks the location and network addressing information of each container during operation of system 200.

Fabric management server 201N provides management and monitoring functions for a SAN such as SAN 140 of FIG. 1. The fabric management server includes a number of sub-functions that are used for SAN management, including but not limited to fabric zone server 206A, security policy server 206B, fabric configuration server 206C, and unzoned name server 206D. The fabric zone server 206A can provide zoning management via a service (or set of commands) that supports the definition of zones in a SAN such as SAN 140, for example, adding of members to zones, defining zone sets, activating and deactivating zone sets, and merging zone information when switches are joined. The zoning definitions can be implemented in one or more zoning tables of the SAN. The zoning tables can be maintained by the fabric zone server 206A and locally stored in the container system 200 that hosts the fabric management server 201N. In order for any two connected ports in the SAN 140 to directly communicate, the two connected ports must be in the same zone according to the zoning tables. The fabric zone server 206A is discussed in further detail below with respect to method 400 of FIG. 4.

The security policy server 206B can provide a mechanism to create and administer fabric security policies in a SAN such as SAN 140. The security policies can define SAN attributes such as: switches and nodes that are allowed to join the fabric, which switches are authorized to connect to other switches in the SAN, and whether authentication is required between elements (e.g., nodes and/or switches) in the SAN. The security policy of the SAN can be locally stored in the container system 200 that hosts the fabric management server 201N. The security policy server 206B is discussed in further detail below with respect to method 500 of FIG. 5.

The fabric configuration server 206C can provide services that enable a management application to obtain information about interconnected SAN elements, their ports, associated links, and entities attached to those links (via, e.g., node ports). The fabric configuration server 206C can receive a request node identifier (RNID) extended link service (ELS) command from a fabric controller that is associated with a switch in the SAN, and provide configuration information about the SAN 140 to the requesting fabric controller in response to the RNID request. The unzoned name server 206D can provide visibility to the entire name server database of the SAN, regardless of any zoning that may be in effect, for a management application (e.g., the fabric management server interface) via the fabric management server 201N. A normal request (e.g., a request that is handled by fabric configuration server 206C) to the name server from a requesting port in the SAN may be filtered to return only information about other ports in the SAN that are in the same zone as the requesting port; however, this may not be sufficient for applications that need to see the entire name server database. The unzoned name server 206D provides such a global view of the entire name server database of the SAN for such applications via the fabric management server 201N. The name server database of the SAN can be locally maintained in the container system 200 that hosts the fabric management server 201N.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, applications, containers, sub-functions, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
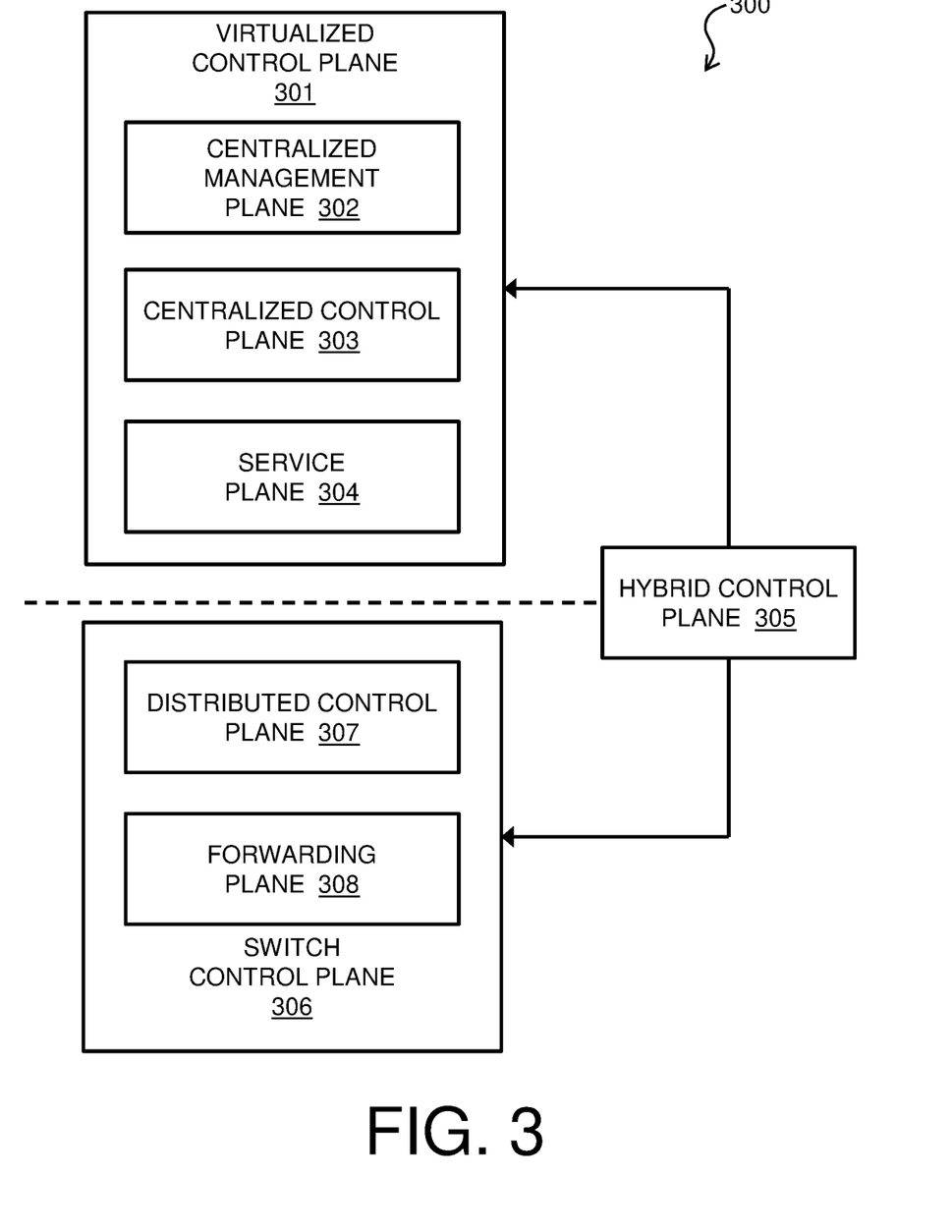
FIG. 3 is a block diagram of components of a system for a hybrid control plane including a virtualized fabric management server for a storage area network in accordance with one or more embodiments of the present invention.

FIG. 3 is a block diagram of components of a system 300 for a hybrid control plane 305 including a virtualized fabric management server for a storage area network in accordance with one or more embodiments of the present invention. Embodiments of system 300 can be implemented in conjunction with system 100 of FIG. 1. Hybrid control plane 305 includes a virtualized control plane 301 and a switch control plane 306. Virtualized control plane 301 includes a centralized management plane 302, a centralized control plane 303, and service plane 304. Virtualized control plane 301 can correspond to fabric management server 114 of FIG. 1, and to fabric management server 201N in container system 200 of FIG. 2. Switch control plane 306 includes a distributed control plane 307 and a forwarding plane 308. Switch control plane 306 can be implemented in one or more switches in the SAN 140 of FIG. 1. Virtualized control plane 301 and switch control plane 306 can work together to provide fabric management functions in the SAN 140. The distributed control plane 307 of switch control plane 306 can include a control unit port (CUP) that is used for communications with the virtualized control plane 301.

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional memory components, embedded controllers, functional blocks, connections between functional blocks, modules, inputs, outputs, control planes, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
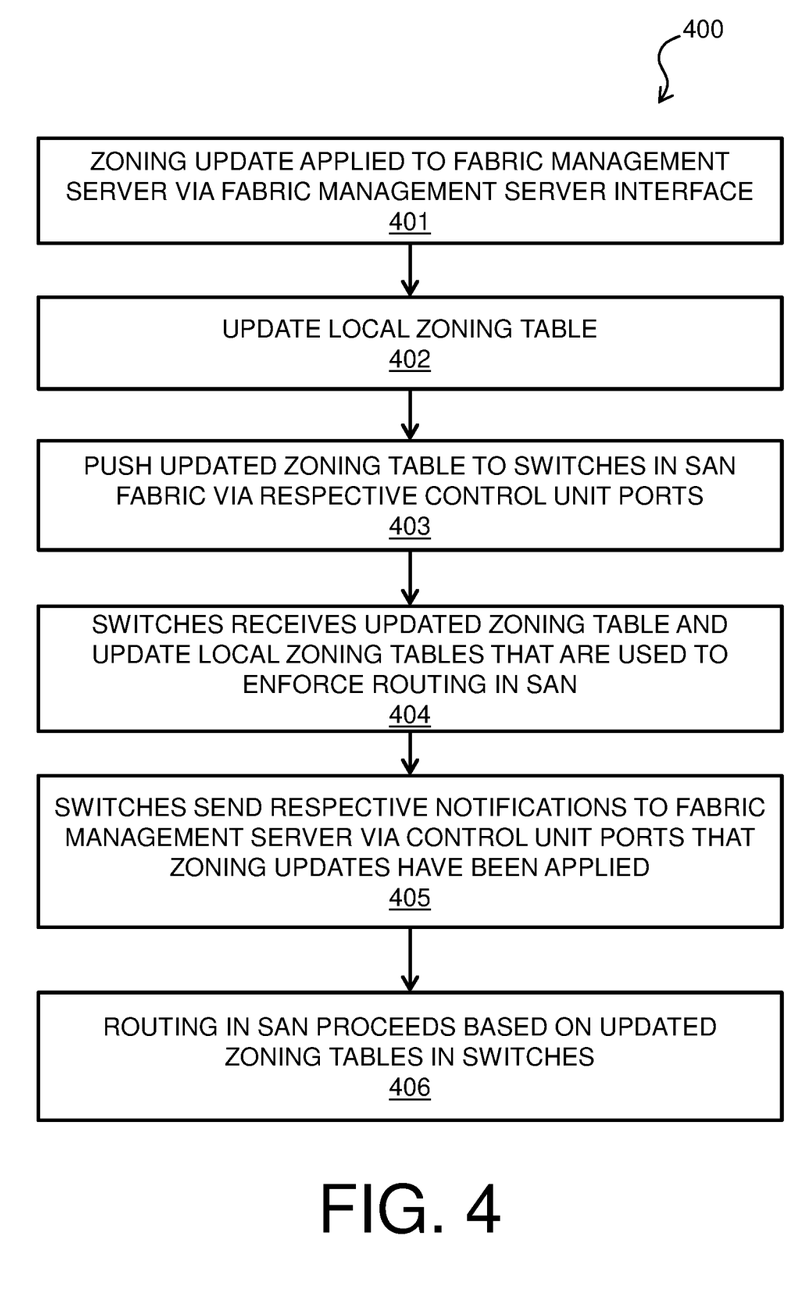
FIG. 4 is a flow diagram of a process for a zoning update for a virtualized fabric management server for a storage area network in accordance with one or more embodiments of the present invention.

FIG. 4 is a flow diagram of a method 400 for a zoning update for a virtualized fabric management server for a storage area network in accordance with one or more embodiments of the present invention. Method 400 can be implemented in embodiments of fabric zone server 206A in fabric management server 201N of FIG. 2, in conjunction with elements of system 100 of FIG. 1 and system 300 of FIG. 3. Method 400 of FIG. 4 provides zoning management in the SAN 140. In block 401 of method 400, a zoning update for a SAN such as SAN 140 is applied to the fabric management server 114/201N via a fabric management server interface. The zoning update of block 401 can be initiated by an administrator of the SAN 140 via the fabric management server interface in some embodiments of the invention, or initiated by a host in the SAN 140 in some embodiments of the invention. The zoning update of block 401 can include any appropriate zoning action, including but not limited to adding of a member to one or more zones, defining zone sets, activating and deactivating zone sets, and merging zone information when switches are joined in the SAN 140.

In block 402, a local zoning table (e.g., that is maintained locally to the container that hosts fabric management server 201N and fabric zone server 206A) is updated by fabric zone server 206A based on the zoning update of block 401. In block 403, the updated zoning table of block 402 is pushed by fabric management server 114/201N via the centralized control plane 303 and optical connection 122 to any attached switches in the SAN 140 via the distributed control plane 307 and each switch's respective CUP. In block 404, each switch that received the updated zoning table in block 403 updates a respective local zoning table based on the received updated zoning table. If a switch in the SAN 140 is a controlling switch that manages one or more subordinate switches, the managing switch can also provide the updated zoning table to the subordinate switches in block 404. In block 405, based on completion of the zoning table update of block 404, each switch can send a notification to the fabric management server 114/201N via the switch's respective CUP that the zoning table update has been applied. If a switch in the SAN 140 is a controlling switch, the controlling switch may not send the notification of block 405 until after all of the subordinate switches have completed the updating of their respective local zoning tables. In block 406, routing in the SAN 140 proceeds based on the updated zoning tables in the switches of the SAN.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
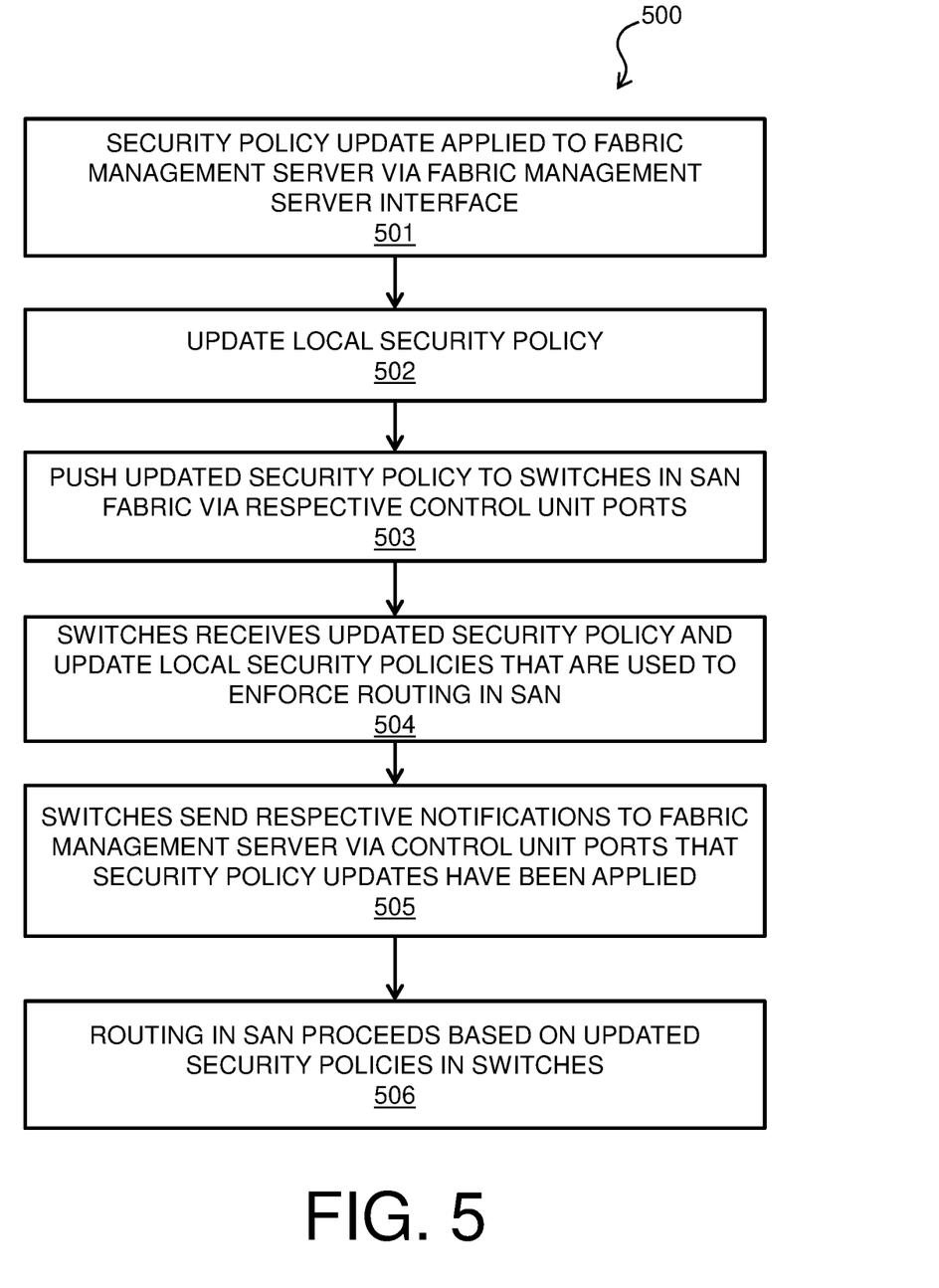
FIG. 5 is a flow diagram of a process for a security policy update for a virtualized fabric management server for a storage area network in accordance with one or more embodiments of the present invention.

FIG. 5 is a flow diagram of a method 500 for a security policy update for a virtualized fabric management server for a storage area network in accordance with one or more embodiments of the present invention. Method 500 can be implemented in embodiments of security policy server 206B in fabric management server 201N of FIG. 2, in conjunction with elements of system 100 of FIG. 1 and system 300 of FIG. 3. Method 500 of FIG. 5 provides security policy management in the SAN 140. In block 501 of method 500, a security policy update for a SAN such as SAN 140 is applied to the fabric management server 114/201N via a fabric management server interface. The security policy update of block 501 can be initiated by an administrator of the SAN 140 via the fabric management server interface in some embodiments of the invention, or initiated by a host in the SAN 140 in some embodiments of the invention. The security policy update of block 501 can include any appropriate security policy attributes of the SAN 140, including but not limited to: switches and nodes that are allowed to join the fabric, which switches are authorized to connect to other switches in the SAN, and whether authentication is required between elements (e.g., nodes and/or switches) in the SAN.

In block 502, a local security policy (e.g., that is maintained locally to the container that hosts fabric management server 201N and security policy server 206B) is updated by security policy server 206B based on the security policy update of block 501. In block 503, the updated security policy of block 502 is pushed by fabric management server 114/201N via the centralized control plane 303 and optical connection 122 to any attached switches in the SAN 140 via the distributed control plane 307 and each switch's respective CUP. In block 504, each switch that received the updated security policy in block 503 updates a respective local security policy based on the received updated security policy. If a switch in the SAN 140 is a controlling switch that manages one or more subordinate switches, the managing switch can also provide the updated security policy to the subordinate switches in block 504. In block 505, based on completion of the security policy update of block 504, each switch can send a notification to the fabric management server 114/201N via the switch's respective CUP that the security policy update has been applied. If a switch in the SAN 140 is a controlling switch, the controlling switch may not send the notification of block 505 until after all of the subordinate switches have completed the updating of their respective local security policies. In block 506, routing in the SAN 140 proceeds based on the updated local security policies in the switches of the SAN.

The process flow diagram of FIG. 5 is not intended to indicate that the operations of the method 400 are to be executed in any particular order, or that all of the operations of the method 400 are to be included in every case. Additionally, the method 400 can include any suitable number of additional operations.

Figure 6:
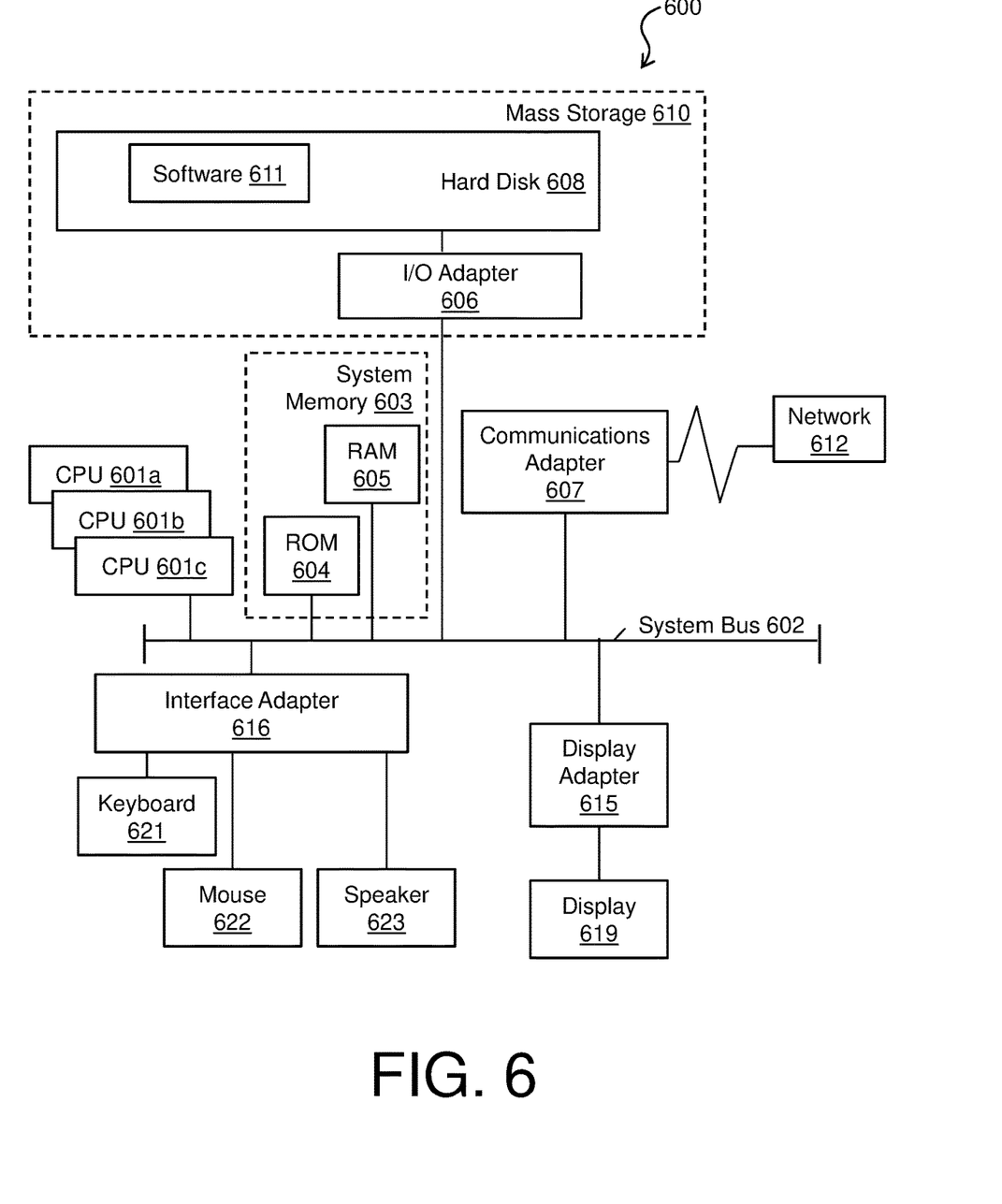
FIG. 6 is a block diagram of an example computer system for use in conjunction with one or more embodiments of a virtualized fabric management server for a storage area network.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is readwrite memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   operating a storage area network, the storage area network comprising a hybrid control plane, the hybrid control plane comprising a virtualized control plane and a switch control plane, the switch control plane located within a switch of the storage area network; and
   managing, using a virtualized fabric management server and the hybrid control plane, the storage area network, wherein the virtualized fabric management server is disposed in a container that is hosted by an element of the storage area network, wherein the element comprises a processor in a processor pool of an input/output (I/O) adapter card of a node of the storage area network,
   wherein managing the storage area network comprises providing, using a fabric zone server of the virtualized fabric management server, zoning management of the storage area network, wherein in order for any two ports in the storage area network to directly communicate, the two ports must be in the same zone according to zoning tables of the storage area network.

2. The computer-implemented method of claim 1, wherein providing zoning management of the storage area network comprises:
   receiving a zoning update by the virtualized fabric management server;
   updating a local zoning table of the virtualized fabric management server by the fabric zone server to create an updated zoning table;
   pushing the updated zoning table to the switch of the storage area network via the hybrid control plane; and
   receiving a notification from the switch that a local zoning table of the switch has been updated based on the updated zoning table.

3. The computer-implemented method of claim 1, wherein managing the storage area network further comprises:
   providing, using a security policy server of the virtualized fabric management server, security policy management of the storage area network.

4. The computer-implemented method of claim 3, wherein providing security policy management of the storage area network comprises:
   receiving a security policy update by the virtualized fabric management server;
   updating a local security policy of the virtualized fabric management server by the security policy server to create an updated security policy;
   pushing the updated security policy to the switch of the storage area network via the hybrid control plane; and
   receiving a notification from the switch that a local security policy of the switch has been updated based on the updated security policy.

5. The computer-implemented method of claim 1, wherein managing the storage area network further comprises:
   providing, using a fabric configuration server of the virtualized fabric management server, fabric configuration information of the storage area network to a port of the storage area network in response to a request node identifier (RNID) extended link service (ELS) request from the port; and
   providing, using an unzoned name server of the virtualized fabric management server, a global view of a configuration of the storage area network to a management application of the storage area network.

6. A system comprising:
   a non-transitory memory having computer readable instructions; and
   one or more processors for executing the computer readable instructions, the computer readable instructions controlling the one or more processors to perform operations comprising:

operating a storage area network, the storage area network comprising a hybrid control plane, the hybrid control plane comprising a virtualized control plane and a switch control plane, the switch control plane located within a switch of the storage area network; and managing, using a virtualized fabric management server and the hybrid control plane, the storage area network, wherein the virtualized fabric management server is disposed in a container that is hosted by an element of the storage area network, wherein the element comprises a processor in a processor pool of an input/output (I/O) adapter card of a node of the storage area network, wherein managing the storage area network comprises providing, using a fabric zone server of the virtualized fabric management server, zoning management of the storage area network, wherein in order for any two ports in the storage area network to directly communicate, the two ports must be in the same zone according to zoning tables of the storage area network.

7. The system of claim 6, wherein providing zoning management of the storage area network comprises:
receiving a zoning update by the virtualized fabric management server;
updating a local zoning table of the virtualized fabric management server by the fabric zone server to create a updated zoning table;
pushing the updated zoning table to the switch of the storage area network via the hybrid control plane; and
receiving a notification from the switch that a local zoning table of the switch has been updated based on the updated zoning table.

8. The system of claim 6, wherein managing the storage area network further comprises:
providing, using a security policy server of the virtualized fabric management server, security policy management of the storage area network.

9. The system of claim 8, wherein providing security policy management of the storage area network comprises:
receiving a security policy update by the virtualized fabric management server;
updating a local security policy of the virtualized fabric management server by the security policy server to create an updated security policy;
pushing the updated security policy to the switch of the storage area network via the hybrid control plane; and
receiving a notification from the switch that a local security policy of the switch has been updated based on the updated security policy.

10. The system of claim 6, wherein managing the storage area network further comprises:
providing, using a fabric configuration server of the virtualized fabric management server, fabric configuration information of the storage area network to a port of the storage area network in response to a request node identifier (RNID) extended link service (ELS) request from the port; and
providing, using an unzoned name server of the virtualized fabric management server, a global view of a configuration of the storage area network to a management application of the storage area network.

11. A computer program product comprising a computer readable storage medium having program instructions embodied therewith, the program instructions executable by one or more processors to cause the one or more processors to perform operations comprising:
operating a storage area network, the storage area network comprising a hybrid control plane, the hybrid control plane comprising a virtualized control plane and a switch control plane, the switch control plane located within a switch of the storage area network; and managing, using a virtualized fabric management server and the hybrid control plane, the storage area network, wherein the virtualized fabric management server is disposed in a container that is hosted by an element of the storage area network, wherein the element comprises a processor in a processor pool of an input/output (I/O) adapter card of a node of the storage area network, wherein managing the storage area network comprises providing, using a fabric zone server of the virtualized fabric management server, zoning management of the storage area network, wherein in order for any two ports in the storage area network to directly communicate, the two ports must be in the same zone according to zoning tables of the storage area network.

12. The computer program product of claim 11, wherein providing zoning management of the storage area network comprises:
receiving a zoning update by the virtualized fabric management server;
updating a local zoning table of the virtualized fabric management server by the fabric zone server to create an updated zoning table;
pushing the updated zoning table to the switch of the storage area network via the hybrid control plane; and
receiving a notification from the switch that a local zoning table of the switch has been updated based on the updated zoning table.

13. The computer program product of claim 11, wherein managing the storage area network further comprises:
providing, using a security policy server of the virtualized fabric management server, security policy management of the storage area network.

14. The computer program product of claim 13, wherein providing security policy management of the storage area network comprises:
receiving a security policy update by the virtualized fabric management server;
updating a local security policy of the virtualized fabric management server by the security policy server to create an updated security policy;
pushing the updated security policy to the switch of the storage area network via the hybrid control plane; and
receiving a notification from the switch that a local security policy of the switch has been updated based on the updated security policy.

15. The computer program product of claim 11, wherein managing the storage area network further comprises:
providing, using a fabric configuration server of the virtualized fabric management server, fabric configuration information of the storage area network to a port of the storage area network in response to a request node identifier (RNID) extended link service (ELS) request from the port; and
providing, using an unzoned name server of the virtualized fabric management server, a global view of a configuration of the storage area network to a management application of the storage area network.

* * * * *